(12) United States Patent
Lee et al.

(10) Patent No.: US 6,662,675 B2
(45) Date of Patent: Dec. 16, 2003

(54) SYNCHRONOUS BRAKE DEVICE

(76) Inventors: Sen-Yung Lee, 9F, No. 84, Section 3, Chang-Rong Road, Tainan City (TW); Chung-Shun Su, No. 76, Kai-Shan Road, Tainan City (TW)

(*) Notice: Subject to any disclaimer, the term of this patent is extended or adjusted under 35 U.S.C. 154(b) by 25 days.

(21) Appl. No.: 10/058,345

(22) Filed: Jan. 30, 2002

(65) Prior Publication Data

US 2003/0140724 A1 Jul. 31, 2003

(51) Int. Cl.[7] .................................................. F16C 1/10
(52) U.S. Cl. ........................ 74/500.5; 74/501.5 R; 74/502.6; 188/24.16
(58) Field of Search ................. 74/500.5, 501.5 R, 74/501.6, 502.2, 502.6; 188/24.15, 24.16, 24.11

(56) References Cited

U.S. PATENT DOCUMENTS

| | | | | |
|---|---|---|---|---|
| 4,057,127 A | * | 11/1977 | Woodring | 188/24.16 |
| 4,480,720 A | * | 11/1984 | Shimano | 188/24.15 |
| 6,186,282 B1 | * | 2/2001 | Juan | 188/24.16 |
| 6,523,649 B1 | * | 2/2003 | Juan | 188/24.16 |

FOREIGN PATENT DOCUMENTS

| | | | | |
|---|---|---|---|---|
| DE | 19953947 A1 | * | 5/2000 | B60T/11/06 |
| DE | 19853656 A1 | * | 6/2000 | F16C/1/14 |
| EP | 995653 A2 | * | 4/2000 | B60T/7/08 |
| GB | 2153460 A | * | 8/1985 | B62L/3/08 |
| JP | 62066311 A | * | 3/1987 | G05G/9/00 |
| JP | 2000309294 A | * | 11/2000 | B62L/3/08 |

\* cited by examiner

*Primary Examiner*—David Fenstermacher
(74) *Attorney, Agent, or Firm*—Rosenberg, Klein & Lee

(57) ABSTRACT

A synchronous brake device includes a carrier movably received in a box and a pulley received in the carrier and two ends of the pulley movably engaged with two slots defined through two opposite faces of the box. A brake cable reeves through the pulley and two ends of the brake cable are connected to two respective brake levers. A bridge member movably received in the carrier and two operation cables fixedly connected to the bridge member and extend through a bottom of the box and are connected to two brake mechanisms. Either end of the brake cable is pulled, the carrier is pulled upward and pulls the operation cables.

3 Claims, 7 Drawing Sheets

SYNCHRONOUS BRAKE DEVICE

FIELD OF THE INVENTION

The present invention relates to a synchronous brake device that allows two brake mechanisms to be activated by pulling either one of two brake levers.

BACKGROUND OF THE INVENTION

A conventional brake device for bicycles generally includes two brake levers one two ends of the handlebar and are operated by two hands of rider. Generally, the front wheel brake mechanism is controlled by the brake lever on the right end of the handlebar, and the rear wheel brake mechanism is controlled by the other brake lever on the left end of the handlebar. When the rider has only one hand free to operate the brake lever, the rear wheel brake mechanism is usually chosen to be activated or the bicycle could flip over if the front wheel mechanism is the only one brake mechanism that is locked dead. This is especially obvious when the bicycle goes downward from a hill. Although some brake devices are developed to be synchronous by pulling only one brake lever, the brake function fails when one of the two brake cables is broken. The device cannot be adjusted according to the gap change of the brake pads and the wheel rims.

SUMMARY OF THE INVENTION

In accordance with one aspect of the present invention, there is provided a brake device comprising a box with a box-like carrier movably received therein and a pulley is received in the open top of the carrier. Two ends of a shaft of the pulley are rotatably engaged with two holes in two opposite walls of the carrier and the two slots in the box.

A bridge member is movably located on an inside of the bottom of the carrier. A lead thread rod extends through the other two opposite walls of the carrier and is threadedly engaged with the bridge member.

A brake cable reeves through the pulley and two ends of the brake cable extend through a top of the box and are connected to two brake levers. Two respective operation cables extend through a first elongate hole in the bottom of the box and a second elongate hole of the carrier and are fixedly connected to the bridge member.

The primary object of the present invention is to provide a synchronous brake device that synchronously brakes the front wheel and the rear wheel by pulling only one brake lever.

Another object of the present invention is to provide a synchronous brake device that adjusts the front wheel brake mechanism and the rear wheel brake mechanism.

Yet another object of the present invention is to provide a synchronous brake device that is functioned even if the brake cable is broken.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENTS

Figure 1:
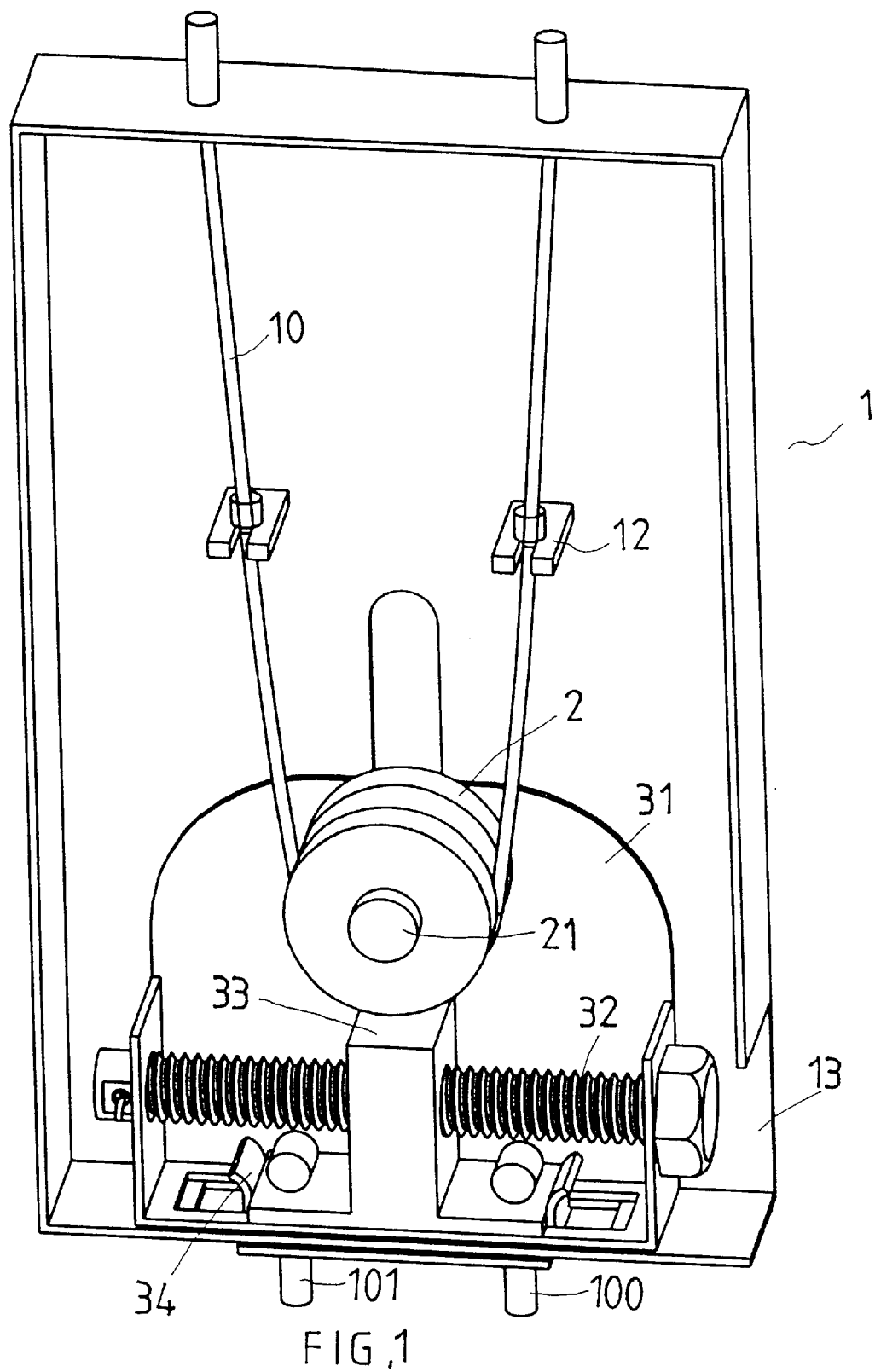
FIG. 1 is a perspective view to show the synchronous brake device of the present invention.
Figure 2:
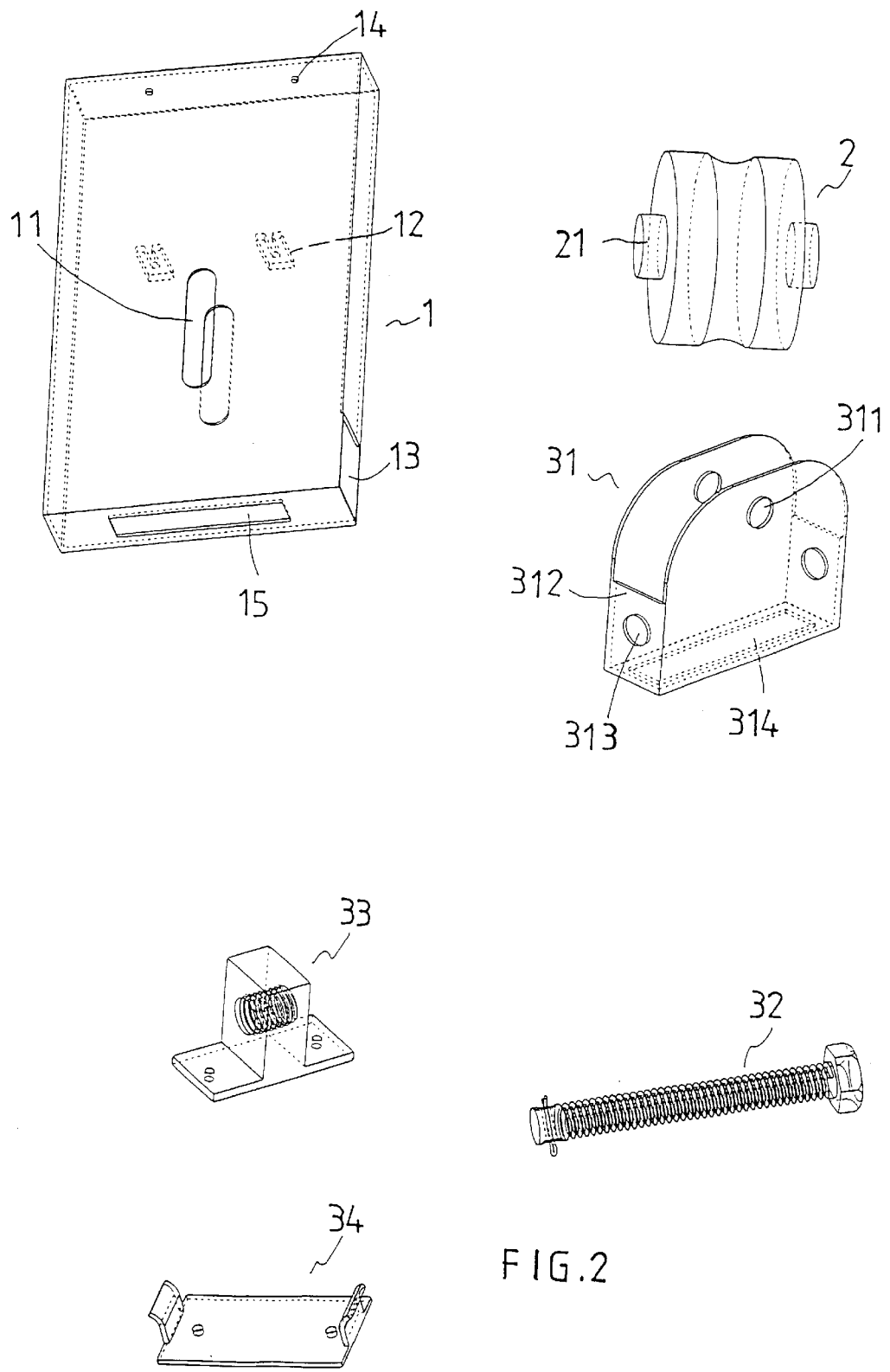
FIG. 2 shows parts of the synchronous brake device of the present invention.
Figure 3:
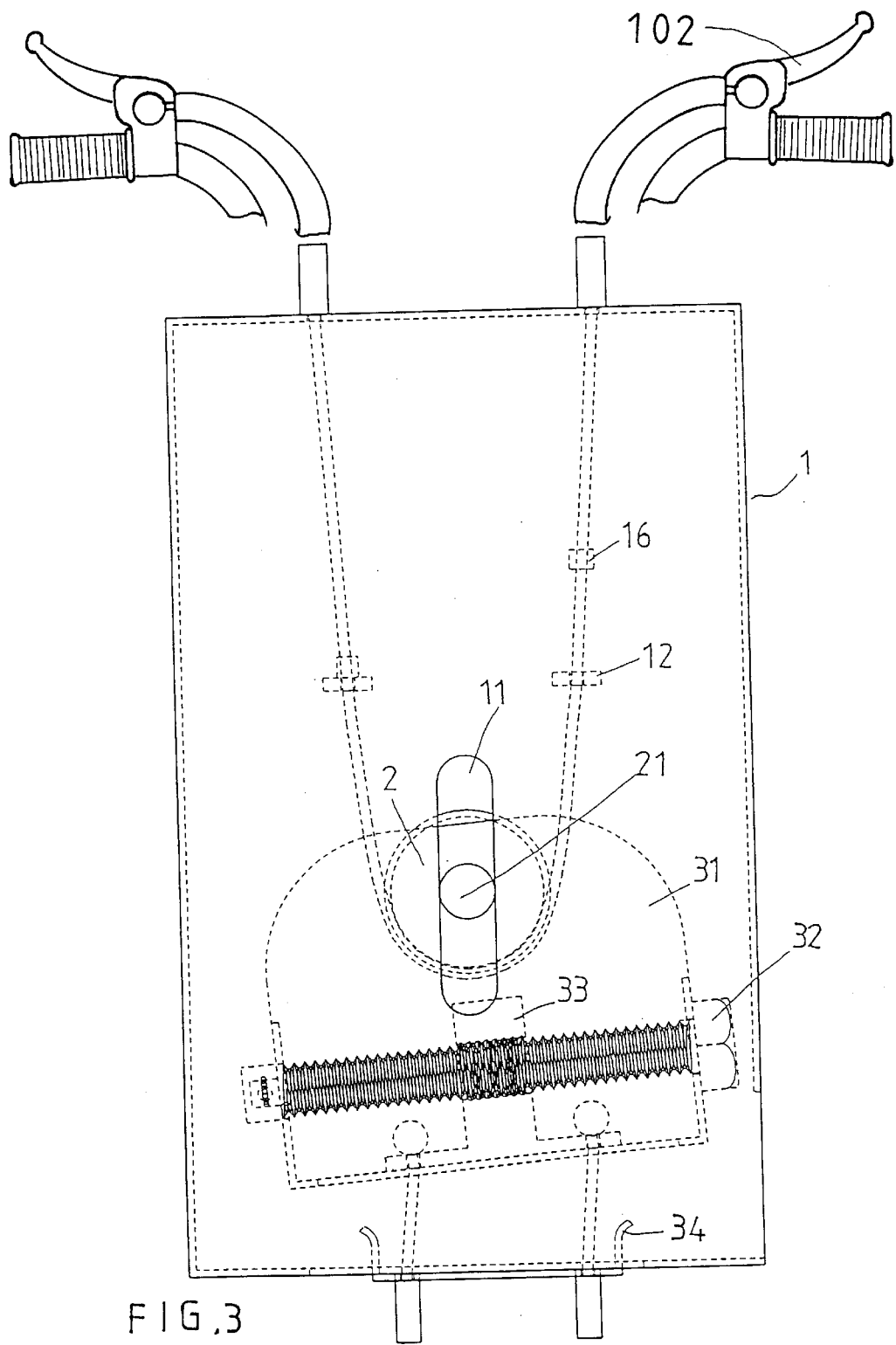
FIG. 3 is a plane view to show the synchronous brake device of the present invention.

Referring to FIGS. 1 to 3, the synchronous brake device comprises a box 1 having two slots 11 defined through two opposite faces thereof. A first elongate hole 15 is defined through a bottom of the box 1. Two fork-like frames 12 extend from an inside of one of the two opposite faces of the box 1.

Figure 6:
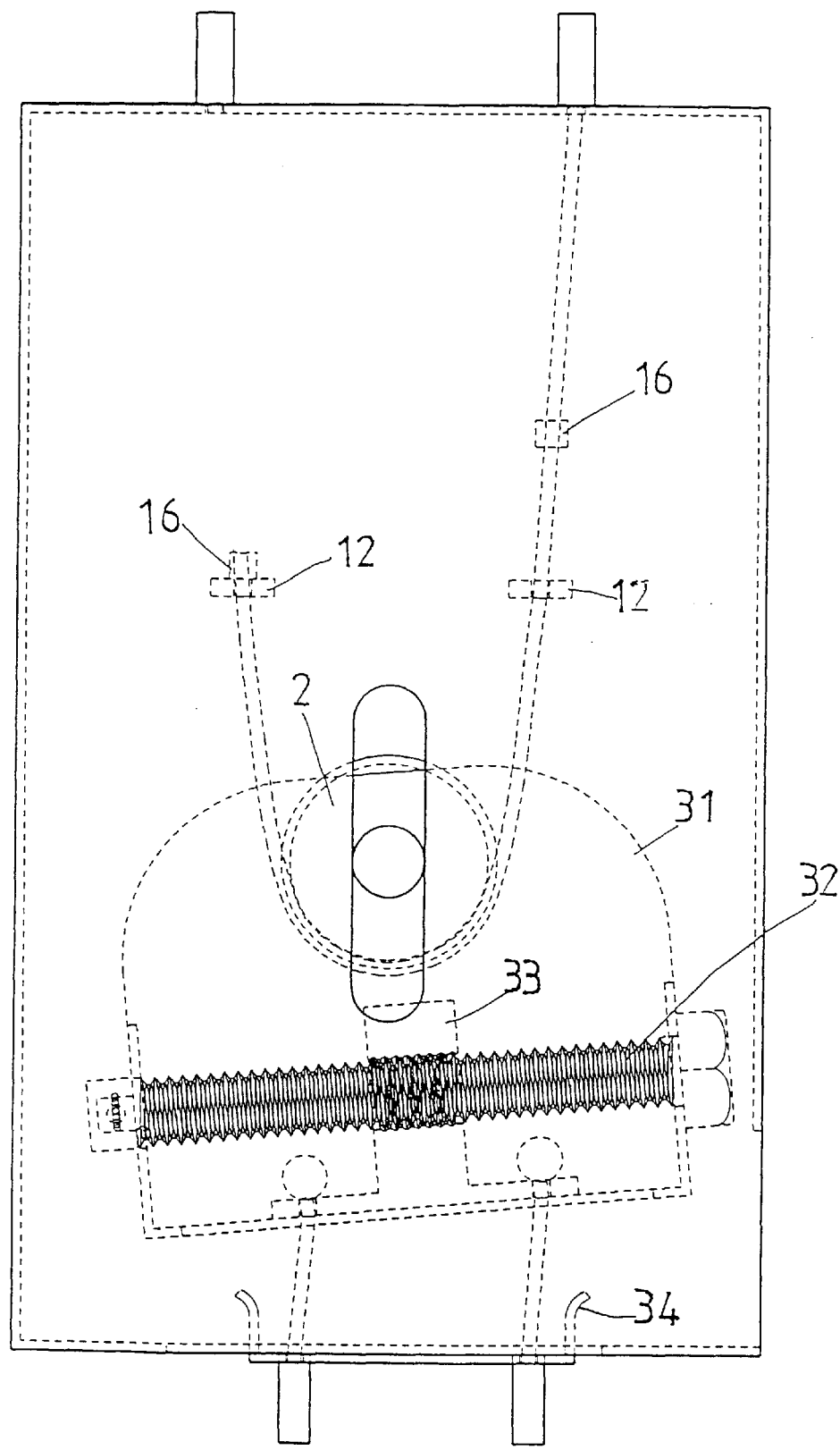
FIG. 6 is a plane view to show the brake cable is broken and the synchronous brake device of the present invention is still functional.

A box-like carrier 31 is movably received in the box 1 and has an open top through which a pulley 2 is received in the carrier 2. A second elongate hole 314 is defined through a bottom of carrier 31. Two ends 21 of a shaft of the pulley 2 are rotatably engaged with two holes 311 in two opposite walls of the carrier 31 and movably received in the two slots 11 in the box 1. A brake cable 10 reeves through the pulley 2 and two ends of the brake cable 10 extend through two holes 14 in a top of the box 1 and are connected to two brake levers 102 as shown in FIG. 3. The brake cable 10 extends through the two frames 12 and two stops 16 are secured on the brake cable 10 and located on the two frames 12 so as to prevent the brake cable 10 from disengaging from the frames 12 in case of the brake cable 10 is broken as shown FIG. 6.

A bridge member 33 is movably located on an inside of the bottom of the carrier 31. A lead thread rod 32 extends through two holes 3131 in the other two opposite walls 312 of the carrier 31 and is threadedly engaged with the bridge member 33.

Two respective operation cables 100, 101 extend through the first elongate hole 15 in the box 1 and the second elongate hole 314 of the carrier 31 and fixedly connected to the bridge member 33. The two operation cables 100, 101 extend through a plate 34 before entering the box 1 and the plate 34 ensures the two operation cables 100, 101 not to be tangled with each other. The operation cables 100, 101 are connected to front wheel brake mechanism and the rear wheel brake mechanism (both not shown).

Figure 4:
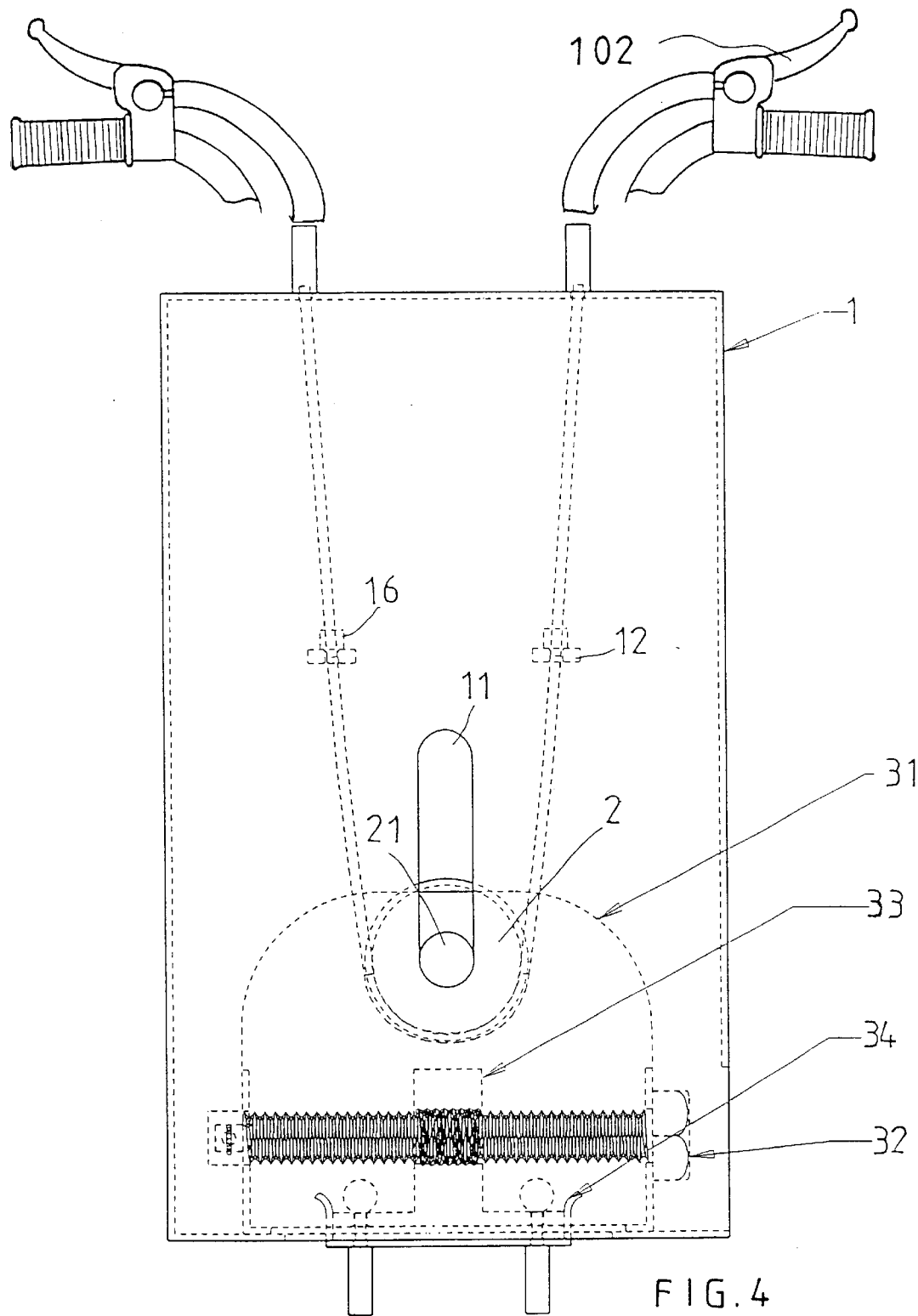
FIG. 4 is a plane view to show the synchronous brake device of the present invention is activated when the brake cable is pulled.

As shown in FIG. 4, when either of the two brake levers 102 is pulled, the pulley 2 and the carrier 31 are lifted and the carrier 31 is inclined. The two operation cables 100, 101 are pulled and brake the front wheel and the rear wheel (both not shown).

Figure 5:
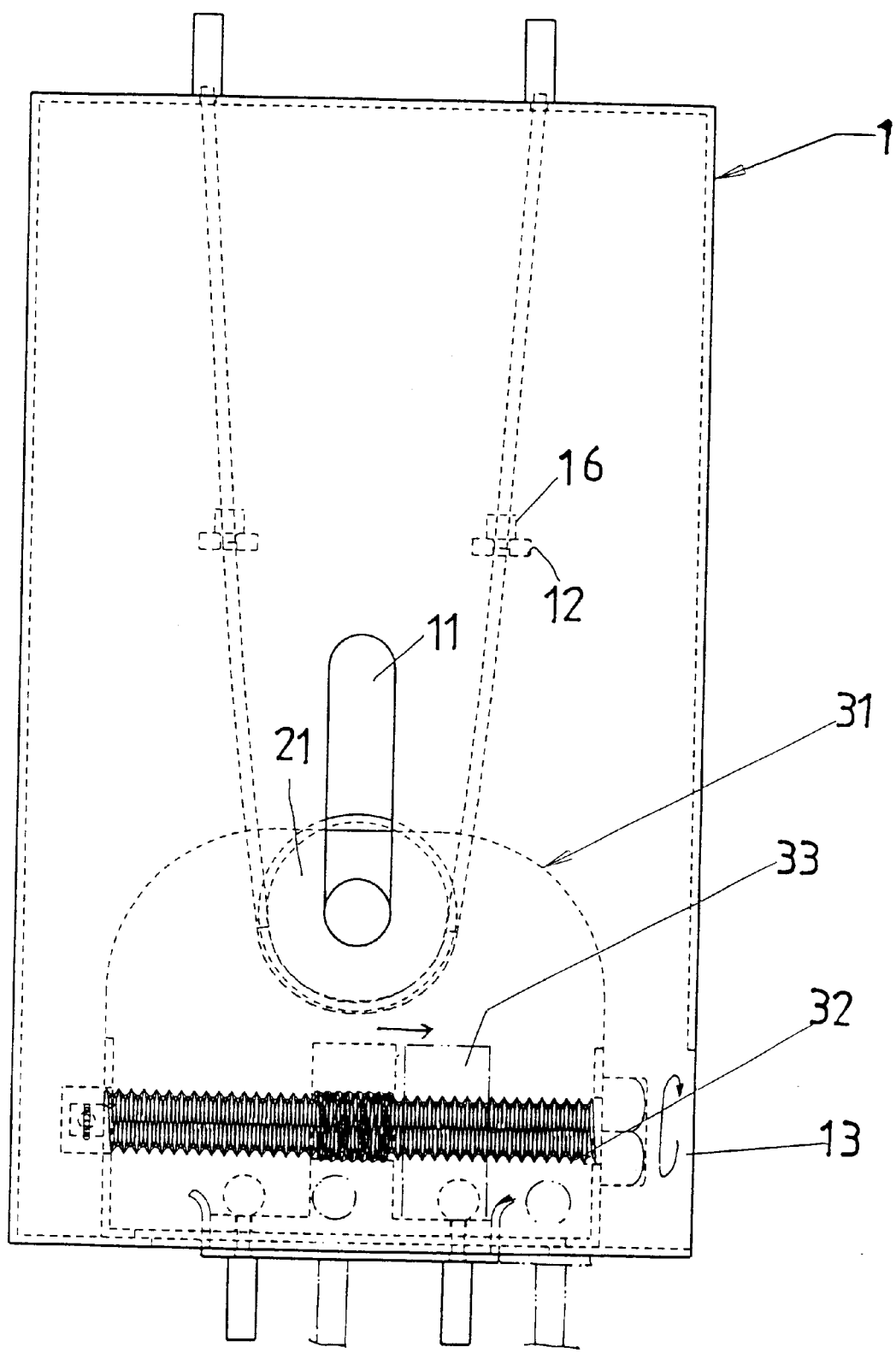
FIG. 5 is a plane view to show the bridge member of the synchronous brake device of the present invention is shifted.

When the gap between the brake pads and the wheel rims changed, the user may rotate the lead thread rod 2 via an aperture 13 defined in a side of the box 1 to shift the bridge member 33 as shown in FIG. 5. By this way, when pulling the brake cable 10, one of the two operation cables 100, 101 will be pulled longer than what is not be adjusted. This enables the front brake mechanism and the rear brake mechanism are simultaneously functioned.

Figure 7:
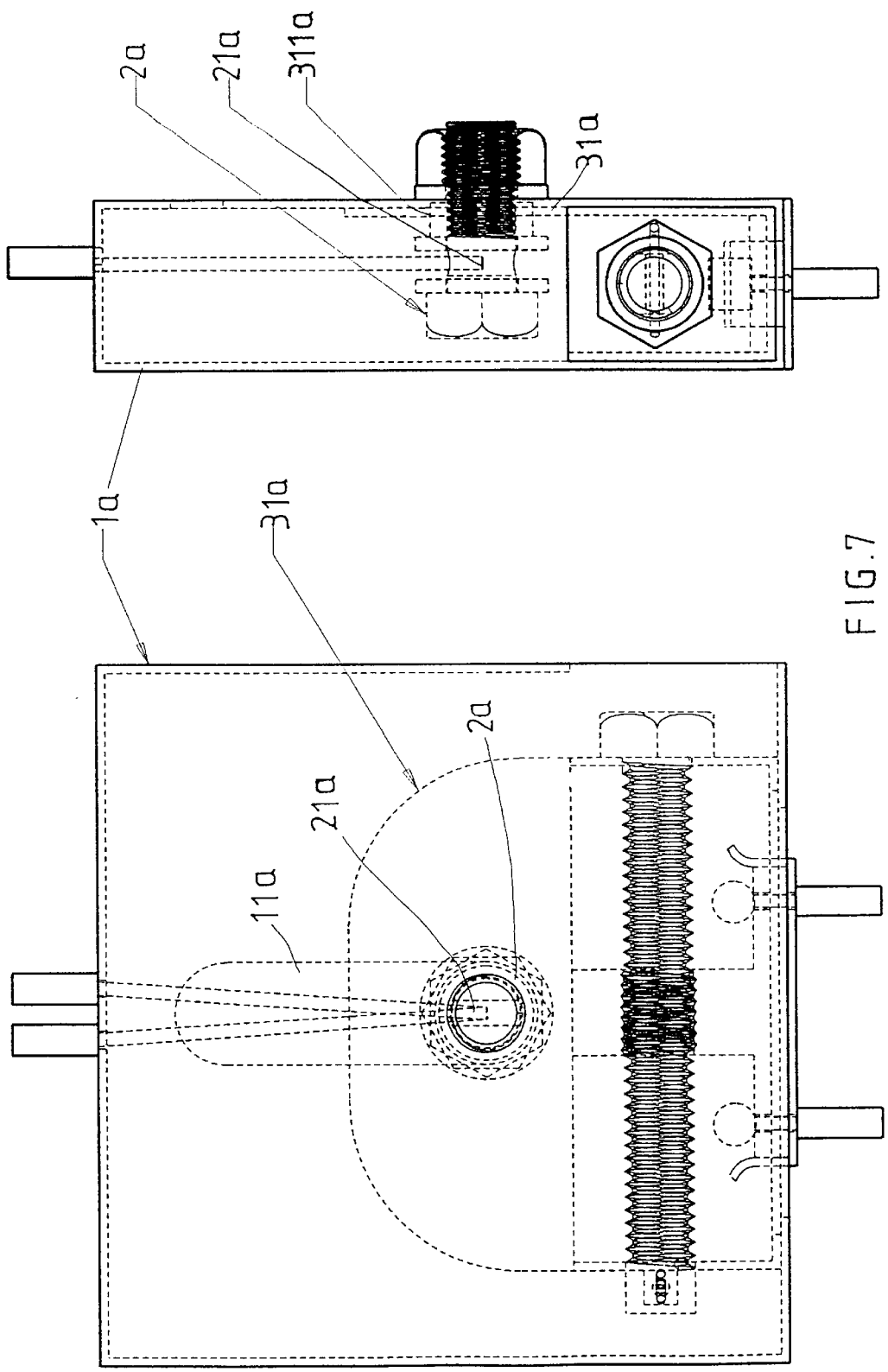
FIG. 7 shows another embodiment of the synchronous brake device of the present invention.

As shown in FIG. 7, the brake device of the present invention is applied on a brake mechanism of motorbikes.

The box 1a has only one slot 11a defined through one of two opposite faces thereof and the box-like carrier 31a is movably received in the box 1a and has an open top. The pulley 2 in the aforementioned embodiment is replaced with the rod 2a which has a plane section 21a and a threaded section which extends through a hole 311a in one of two opposite walls of the carrier 31a and the slot 11a of the box 1a. A nut is engaged with the threaded section.

The brake cable 10 reeves through the plane section 21a of the rod 2a and two ends of the brake cable 10 extend through a top of the box 1 and adapted to be connected to two brake levers.

While we have shown and described the embodiment in accordance with the present invention, it should be clear to those skilled in the art that further embodiments may be made without departing from the scope of the present invention.

What is claimed is:

1. A brake device comprising:

a box having two slots defined through two opposite faces thereof, the box having a first elongate hole defined through a bottom of the box;

a carrier having a box-shape with an open top and being movably received in the box, a second elongate hole being defined through a bottom of the carrier;

a pulley received in the open top of the carrier and having two ends of a shaft of the pulley rotatably engaged with two holes formed in two opposite walls of the carrier, the two ends of the shaft of the pulley being movably received in the two slots in the box;

a bridge member movably located on an inside of the bottom of the carrier, the bridge member being laterally displaceably coupled to the carrier by a lead thread rod extending through the another two opposite walls of the carrier and threadedly engaged with the bridge member; and a brake cable reeving through the pulley and two ends of the brake cable extending through a top of the box and adapted to be connected to two brake levers, two respective operation cables extending through the first elongate hole in the box and the second elongate hole of the carrier and fixedly connected to the bridge member, wherein displacement of at least one of the brake levers longitudinally displaces the carrier relative to the box and the bridge therewith to longitudinally displace the operation cables, and wherein rotation of the lead thread rod laterally displaces the bridge member relative to the carrier to adjust the longitudinal displacement of one operation cable relative to the other.

2. The device as claimed in claim 1, wherein two frames extend from an inside of one of the two opposite faces of the box, each of the frames having an opening formed therethrough with the brake cable extends extending through the respective openings in the frames, the brake cable having a pair of stops secured thereto in respective proximity to the two frames for limiting displacement of the brake cable relative to the box.

3. A brake device comprising:

a box having a slot defined through one of two opposite faces thereof, a first elongate hole defined through a bottom of the box;

a carrier having a box-shape with an open top and being movably received in the box, a second elongate hole being defined through a bottom of the carrier and an aperture being formed through a wall of the carrier adjacent the open top;

a rod received in the aperture of the carrier and having a plane section and a threaded section which extends through the slot of the box, the threaded section having a nut engaged therewith;

a bridge member movably located on an inside of the bottom of the carrier, the bridge member being laterally displaceably coupled to the carrier by a lead thread rod extending through the-ether two opposite walls of the carrier and threadedly engaged with the bridge member; and a brake cable reeving through the plane section of the rod and two ends of the brake cable extending through a top of the box and adapted to be connected to two brake levers, two respective operation cables extending through the first elongate hole in the box and the second elongate hole of the carrier and fixedly connected to the bridge members wherein displacement of at least one of the brake levers longitudinally displaces the carrier relative to the box and the bridge therewith to longitudinally displace the operation cables, and wherein rotation of the lead thread rod laterally displaces the bridge member relative to the carrier to adjust the longitudinal displacement of one operation cable relative to the other.

* * * * *